J. DICK.
FODDER CUTTER FEED CONVEYER.
APPLICATION FILED JULY 8, 1916.

1,296,486.

Patented Mar. 4, 1919.
2 SHEETS—SHEET 1.

Witness:
Ernest C. Crocker

Inventor
Joseph Dick
By Harry Frease
Attorney

J. DICK.
FODDER CUTTER FEED CONVEYER.
APPLICATION FILED JULY 8, 1916.
1,296,486.
Patented Mar. 4, 1919.
2 SHEETS—SHEET 2.
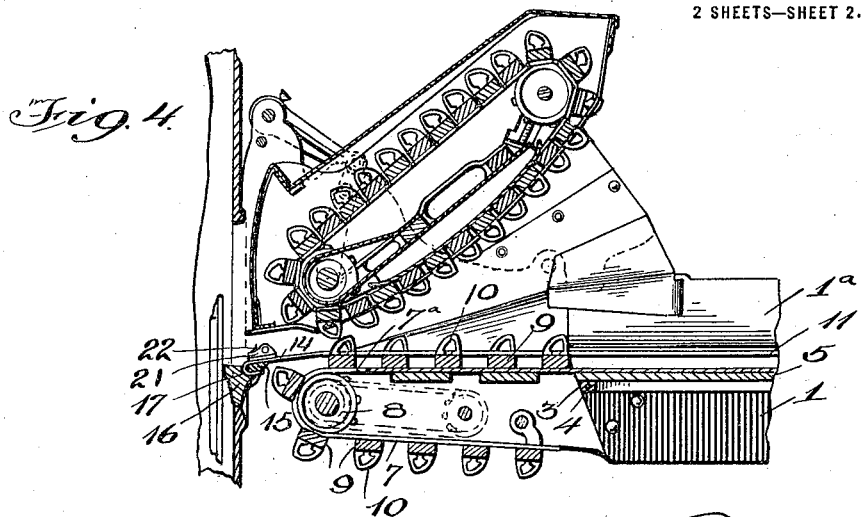
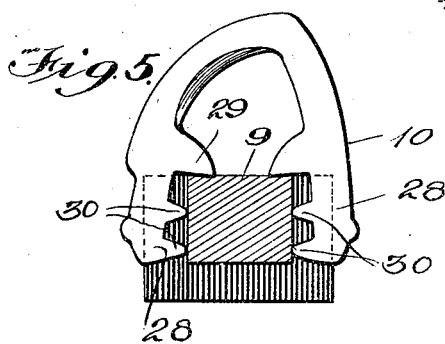
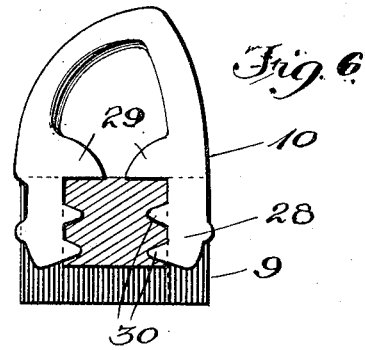
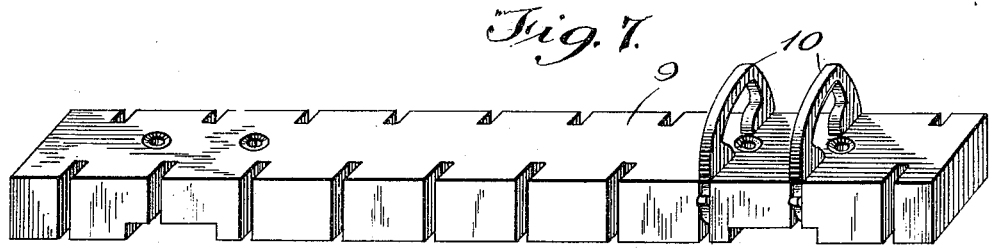
Witness
Ernest O. Crockey
Inventor.
Joseph Dick
Harry Frease
By Attorney.

UNITED STATES PATENT OFFICE.

JOSEPH DICK, OF CANTON, OHIO, ASSIGNOR TO THE JOSEPH DICK MANUFACTURING COMPANY, OF CANTON, OHIO, A CORPORATION OF OHIO.

FODDER-CUTTER FEED-CONVEYER.

1,296,486.  Specification of Letters Patent.  Patented Mar. 4, 1919.

Application filed July 8, 1916. Serial No. 108,192.

*To all whom it may concern:*

Be it known that I, JOSEPH DICK, a citizen of the United States, residing at Canton, in the county of Stark and State of Ohio, have invented certain new and useful Improvements in Fodder-Cutter Feed-Conveyers, of which the following is a specification.

The invention relates to conveyers having laterally spaced longitudinal face bars with protruding teeth operating longitudinally between the bars for feeding corn stalks, alfalfa and other long, limber or tangled material into fodder cutting machines; and the objects of the improvement are to facilitate the withdrawal of the conveyer teeth from the fodder at the delivery end of the conveyer, and to simplify the construction and mounting of the conveyer teeth.

These objects of the invention and other ancillary advantages are attained by the construction and arrangement illustrated in the accompanying drawings, forming part hereof, in which—

Figure 1:
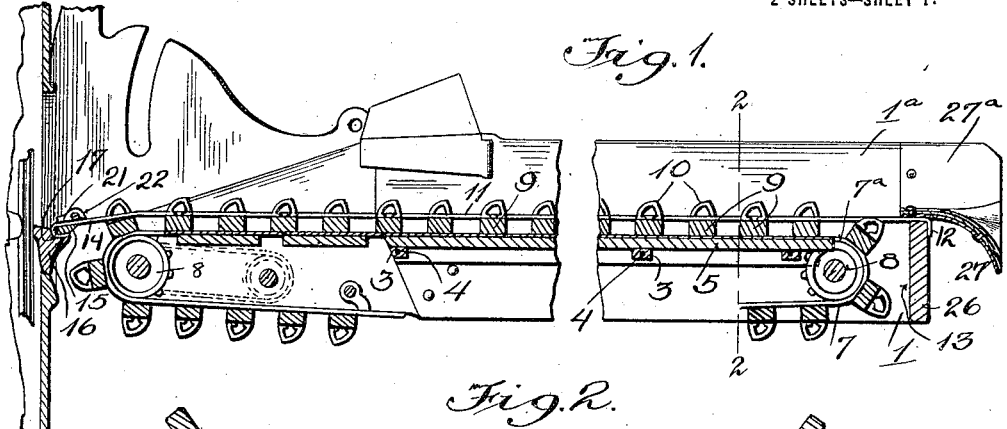
Figure 2:
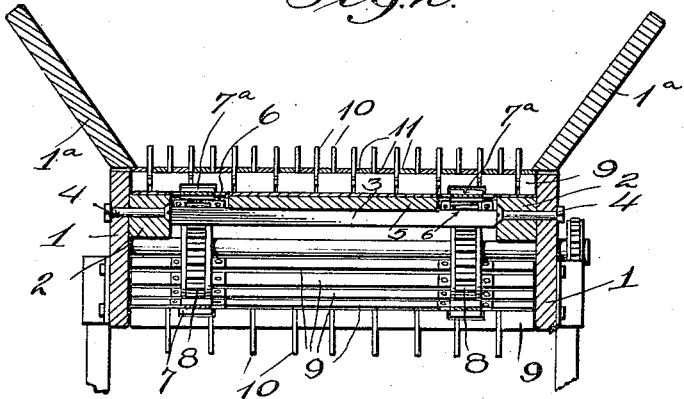
Figure 3:
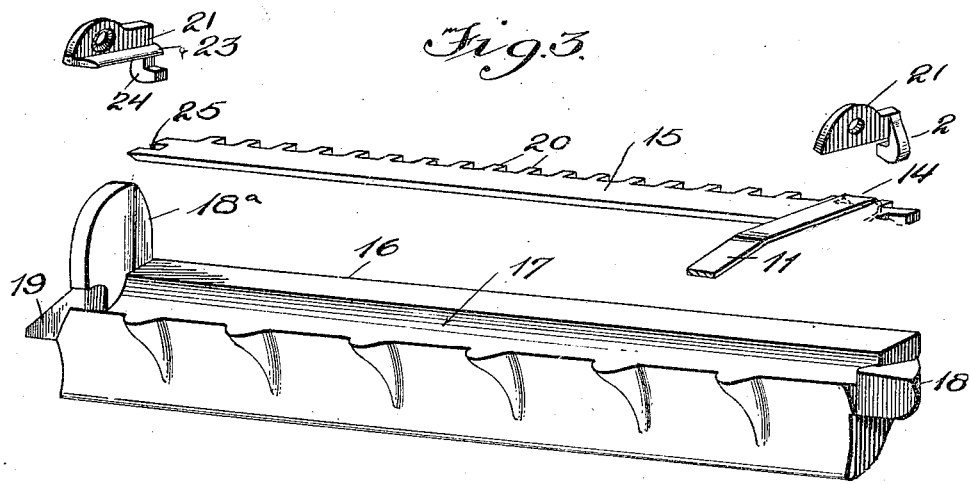

Figure 1 is a longitudinal section of the conveyer trough;

Fig. 2, a cross section thereof, on line 2—2, Fig. 1;

Fig. 3, a dissociated perspective view of the rear ends of the face bars;

Fig. 4, a fragmentary longitudinal section of conveyers arranged to form a feed mechanism for fodder cutters;

Fig. 5, a side elevation of one conveyer tooth before attachment;

Fig. 6, a side elevation of the conveyer tooth after attachment; and

Fig. 7, a perspective view of a cross bar having several conveyer teeth secured thereon.

Similar numerals refer to similar parts throughout the drawings.

The feed trough may include the side walls 1, the upper portions 1ª of which are flared outward in the usual manner; side sills 2, which are clamped between the side walls and the ends of the cross sills 3 by means of bolts 4; and a bearing board 5, located on the cross sills between the side sills of the trough. The bearing board is narrower than the distance between the side sills, thus forming channels or grooves 6 along the bottom of the trough in each side thereof.

An endless conveyer in the bottom of the feed trough is composed of gear chains 7 operating around gear wheels 8, to which chains are secured cross bars 9 each of which carries a row of teeth 10; the space between the gear chains being slightly in excess of the width of the bearing board 5, so that the upper sections 7ª of the gear chains are adapted to operate freely above the cross sills in the channels 6 in each side of the feed trough, while the corresponding cross bars 9 rest and travel upon the upper surface of the bearing board.

The face of the conveyer is composed of the series of laterally spaced longitudinally bars 11, laid loosely between the teeth 10 upon the intervening portions of the cross bars 9; the forward ends 12 of the bars being bent over and secured to the upper edge of the forward end wall 13 of the feed trough; and the rear ends 14 of the bars being bent around the transverse alining bar 15 and may rest upon the forward side of the cutter bar 16 of a fodder cutter, which is preferably provided with a rabbet 17 for receiving the ends of the face bars. The cutter bar is detachably secured to the fodder cutter case as by means of the lug 18 on one end and the lug 18ª and the ear 19 on the other end, and the alining bar 15 is provided with the fingers 20 between which the bent rear ends of the face bars 11 are properly positioned and spaced apart.

A locking bracket 21 is provided for each end of the alining bar 15, which brackets are adapted to enter and be secured in recesses 22 provided therefor in the side walls of the feed hopper, and are provided with the lateral flanges 23 resting upon the ends of the alining bar 15, for stopping the same from upward movement, and are also provided with the depending L-lugs 24, which enter and engage in the notches 25 provided in the ends of the alining bar for preventing a lateral movement thereof. The L-lugs of the locking brackets are inserted around the bottom bars of the feed hopper into the notch on the alining bar by a lateral turning of the bracket, after which the brackets are bolted in position in the sockets 22 in the sides of the feed hopper.

By this construction and arrangement, it is evident that in case of breakage or other occasion, the cutter bar 16 can be removed from under the rear ends of the feed hopper face bars 11 without disturbing or removing the same; and also that in case of need, one or more of the face bars can be removed and replaced without disturbing the cutter bar. At the same time, the rear ends of the face bars are securely held in proper position upon the cutter bar.

The forward ends of the feed hopper face bars 11 rest upon and may be secured to the forward end wall 26 thereof, and may also be bent downward along the forward side thereof, as shown in Fig. 1. For the purpose of preventing the fodder from catching and clogging against the forward end of the feed trough, the curved flared sheet metal flanges 27 and 27$^a$ are secured to the forward ends of the bottom and sides of the feed trough, which flared flanges serve to guide the fodder into and upon the forward end of the trough, and thereby facilitate the operation of the feed mechanism.

In the construction of the conveyer teeth 10, the rear edges thereof are curved forward on such a radius that when they are drawn inward by the chain gearings at the rear ends of the conveyer, they will present a retreating edge at all times during their rearward movement, until they have finally disappeared between the face bars, thereby effecting a withdrawal of the teeth from engagement with the fodder without catching or carrying any of the fodder through the intervals between the longitudinal face bars.

The wooden cross bars 9 are provided with series of opposing pairs of grooves across their side edges for receiving and holding the teeth 10 on the bars. The teeth are made of malleable or other pliant metal, and are V-shaped in general form with an original width between the free ends 28 to permit them to straddle the cross bars so that the free ends of the teeth can be pressed into the grooves by a bending of the teeth.

The teeth are provided on their inner edges with shoulders 29 which are located to bear upon the face of the cross bars, and also with a pair of prongs 30 at their free ends directly below the shoulders, which prongs are pressed into the grooves and engage with the cross bar at the inner edges of the grooves; and these shoulders and prongs serve to rigidly secure the teeth upon the cross bar without the use of nails, screws or other holding devices.

Reference is hereby made to my copending application filed July 8, 1916, Serial No. 108,191, for fodder cutter feed mechanism, containing claims for certain features illustrated and described but not claimed herein.

By this formation, construction and connection of the teeth with the cross bar, it is evident that the forward leg of each tooth, constitutes a positive support which holds the rear leg thereof firmly to its work of pushing fodder and the like rearwardly along the conveyer; and that this support is more direct than positive when the work is being done by the point of the tooth as it disappears below the longitudinal face bars of the conveyer.

I claim:

1. A feed conveyer for fodder cutters and the like, having wooden cross bars with series of grooves across each side edge, and V-shaped malleable teeth having their free ends pressed into the grooves by a bending of the teeth, there being shoulders on the inner edges of the teeth bearing on the face of the bar and prongs on the edges of the teeth engaging in the bottoms of the grooves.

2. A feed conveyer for fodder cutters and the like, having wooden cross bars with series of grooves across each side edge, and V-shaped malleable teeth having their free ends pressed into the grooves by a bending of the teeth, there being shoulders on the inner edges of the teeth bearing on the face of the bar, and prongs on the teeth engaging in the grooves.

3. A feed conveyer for fodder cutters and the like, having wooden cross bars with series of grooves across each side edge, and V-shaped malleable teeth having their free ends pressed into the grooves for engagement with the cross bar.

JOSEPH DICK.